United States Patent
Zweig et al.

(10) Patent No.: US 12,023,798 B2
(45) Date of Patent: Jul. 2, 2024

(54) CUSTOMIZING SETUP FEATURES OF ELECTRONIC DEVICES

(71) Applicant: Intuition Robotics, Ltd., Ramat-Gan (IL)

(72) Inventors: Shay Zweig, Harel (IL); David Edery, Netanya (IL); Eldar Ron, Tel Aviv (IL); Alex Keagel, Tel Aviv (IL); Itai Mendelsohn, Tel Aviv (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 708 days.

(21) Appl. No.: 17/170,066

(22) Filed: Feb. 8, 2021

(65) Prior Publication Data

US 2021/0245367 A1 Aug. 12, 2021

Related U.S. Application Data

(60) Provisional application No. 62/975,425, filed on Feb. 12, 2020.

(51) Int. Cl.
*B25J 11/00* (2006.01)
*B25J 13/08* (2006.01)
*G06F 8/65* (2018.01)
*G06N 20/00* (2019.01)

(52) U.S. Cl.
CPC ........... *B25J 11/0005* (2013.01); *B25J 13/08* (2013.01); *G06F 8/65* (2013.01); *G06N 20/00* (2019.01)

(58) Field of Classification Search
CPC ......... B25J 11/0005; B25J 13/08; G06F 8/65; G06F 9/4451; G06N 20/00
See application file for complete search history.

(56) References Cited

U.S. PATENT DOCUMENTS

| | | | |
|---|---|---|---|
| 11,567,788 B1* | 1/2023 | Khemka | G06Q 10/109 |
| 2015/0277942 A1* | 10/2015 | Rork | G06F 9/44505 |
| | | | 701/31.4 |
| 2016/0039426 A1* | 2/2016 | Ricci | G06F 16/951 |
| | | | 701/1 |
| 2016/0188145 A1* | 6/2016 | Vida | B60K 35/00 |
| | | | 715/745 |

* cited by examiner

*Primary Examiner* — Cao H Nguyen
(74) *Attorney, Agent, or Firm* — M&B IP Analysts, LLC (57) ABSTRACT

A method and system for customizing setup of features of an electronic device. The method includes collecting user data related to a user using the electronic device, wherein the user data is collected, in part, using at least one sensor connected to the electronic device; analyzing the collected user data to determine for each user action of a plurality of user actions a corresponding probability score, wherein a probability score is a probability that the user chooses to perform a particular subsequent user action from the plurality of user actions, wherein a user action of the plurality of user actions is enabled by a setup plan; selecting based on the probability scores at least one setup plan corresponding to an action having the highest probability score; and configuring a feature of the electronic device based on the selected setup plan.

8 Claims, 4 Drawing Sheets

CUSTOMIZING SETUP FEATURES OF ELECTRONIC DEVICES

CROSS-REFERENCE TO RELATED APPLICATIONS

This application claims the benefit of U.S. Provisional Application No. 62/975,425 filed on Feb. 12, 2020, the contents of which are hereby incorporated by reference.

TECHNICAL FIELD

The disclosure generally relates to performing a personalized setup of electronic devices.

BACKGROUND

As manufacturers and developers continue to integrate smart functionalities into various devices, systems, and the like, including appliances and vehicles, the same manufacturers may seek to improve the convenience and ease-of-use of such smart systems. While electronic devices including smart functionalities may include features which provide for an enhanced user experience, such as scheduling, voice control, internet connectivity, and the like, such smart functionalities may be unavailable if the corresponding electronic devices are not properly configured or set up. Configuring or setting up an electronic device may be a complex, time-consuming task, requiring resets, re-configurations, and the like, and increasing a user's frustration and dissatisfaction with an electronic device. While developers and manufacturers may seek to improve the quality of the user experience by completing some setup steps at the point of manufacture, any user-facing setup may still present opportunities for user dissatisfaction.

While manufacturers and developers may perform some setup steps prior to delivering an electronic device to a user, a user may be required to perform further setup, such as initial setup of a new device, per-task setup or configuration of an application or functionality a user wishes to activate, and the like. Further, certain setup and configuration tasks may require multiple steps, certain prerequisites, and the like, further reducing the ease with which a user may set up a device. As an example, a user may wish to set up a voice-calling system on the user's car, which may include the establishment of a prerequisite connection between the user's car and the user's cell phone in order to access the user's contacts directory, which may be saved on the cell phone, which may render the voice-calling setup unavailable until the car-to-phone connection setup has been completed.

As a result of the limitations of user-facing setup processes, manufacturers and developers may employ certain solutions to improve the device setup process. Such solutions include wizards, video tutorials, remote configurations, and the like. However, such solutions may fail to provide for context-aware setup, including setup customization based on data regarding the user and the user's environment. Further, such solutions may fail to provide for setup sequencing, a process by which setup steps may be discretized and presented to the user at the user's convenience, causing the user further frustration and dissatisfaction in the setup process. In addition, setting and customizing configurations of electronic devices may require some technical knowledge. As such, novice users may hesitate to try to make any change in such devices to meet the users' needs.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for customizing setup of features of an electronic device. The method comprises collecting user data related to a user using the electronic device, wherein the user data is collected, in part, using at least one sensor connected to the electronic device; analyzing the collected user data to determine for each user action of a plurality of user actions a corresponding probability score, wherein a probability score is a probability that the user chooses to perform a particular subsequent user action from the plurality of user actions, wherein a user action of the plurality of user actions is enabled by a setup plan; selecting based on the probability scores at least one setup plan corresponding to an action having the highest probability score; and configuring a feature of the electronic device based on the selected setup plan.

Certain embodiments disclosed herein include a system for customizing setup of features of an electronic device. The system comprises a processing circuitry; and a memory, the memory containing instructions that, when executed by the processing circuitry, configure the system to: a processing circuitry; and a memory, the memory containing instructions that, when executed by the processing circuitry, configure the system to: collect user data related to a user using the electronic device, wherein the user data is collected, in part, using at least one sensor connected to the electronic device; analyze the collected user data to determine for each user action of a plurality of user actions a corresponding probability score, wherein a probability score is a probability that the user chooses to perform a particular subsequent user action from the plurality of user actions, wherein a user action of the plurality of user actions is enabled by a setup plan; select based on the probability scores at least one setup plan corresponding to an action having the highest probability score; and configure a feature of the electronic device based on the selected setup plan.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed by the disclosure are only examples of the many possible advantageous uses and implementations of the innovative teachings presented herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The disclosed system and method enable presentation of a personalized setup plan of an electronic device's features. Data about the user of the electronic device, such as a personal computer, a vehicle, a smart appliance, and the like, is collected. The data may also include environmental data, historical user data, sensor data, and the like. An algorithm is applied to the data for analyzing the data. Based on the analysis, a probability score indicating the probability that the user will choose to perform a particular subsequent user action is determined for each possible user action. A user action may be enabled by a predetermined one or more setup plans. Based on the result of the analysis, one or more corresponding setup plans may be selected and presented to the user.

Figure 1:
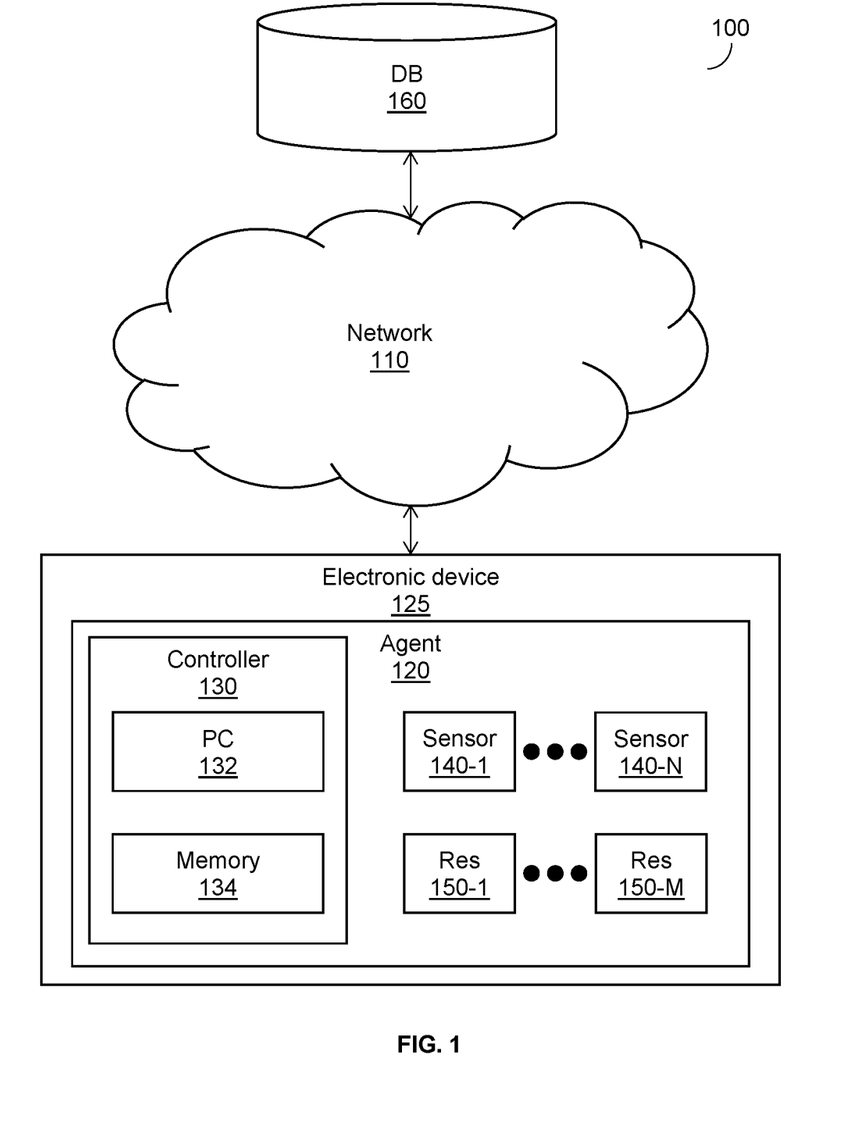
FIG. 1 is a network diagram utilized to describe the various embodiments.

FIG. 1 is an example network diagram of a system 100 utilized for performing a personalized setup of an electronic device's features, according to an embodiment. The system 100 includes an electronic social agent 120 and an electronic device 125. In some embodiments, the agent 120 is further connected to a network, where the network 110 is used to communicate between different parts of the system 100. The network 110 may be, but is not limited to, a local area network (LAN), a wide area network (WAN), a metro area network (MAN), the Internet, a wireless, cellular or wired network, and the like, and any combination thereof.

A user may access the electronic social agent 120 directly, such as via a voice command or an input device connected directly to the electronic social agent 120, or indirectly through the network 110, such as through an application on a mobile phone connected to the internet, where the electronic social agent 120 is additionally connected to the internet. Further, a user may access the electronic social agent 120 through the electronic device 125 in which the electronic social agent 120 resides. The electronic social agent 120 may include hardware, software, and the like, as well as any combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause a processing circuitry to perform the various processes described herein.

In an embodiment, the electronic social agent 120 may be connected to, or implemented on, the electronic device 125.

The electronic device 125 may be, for example and without limitation, a robot, a social robot, a service robot, a smart TV, a smartphone, a wearable device, a vehicle, a computer, a smart appliance, and the like.

Figure 2:
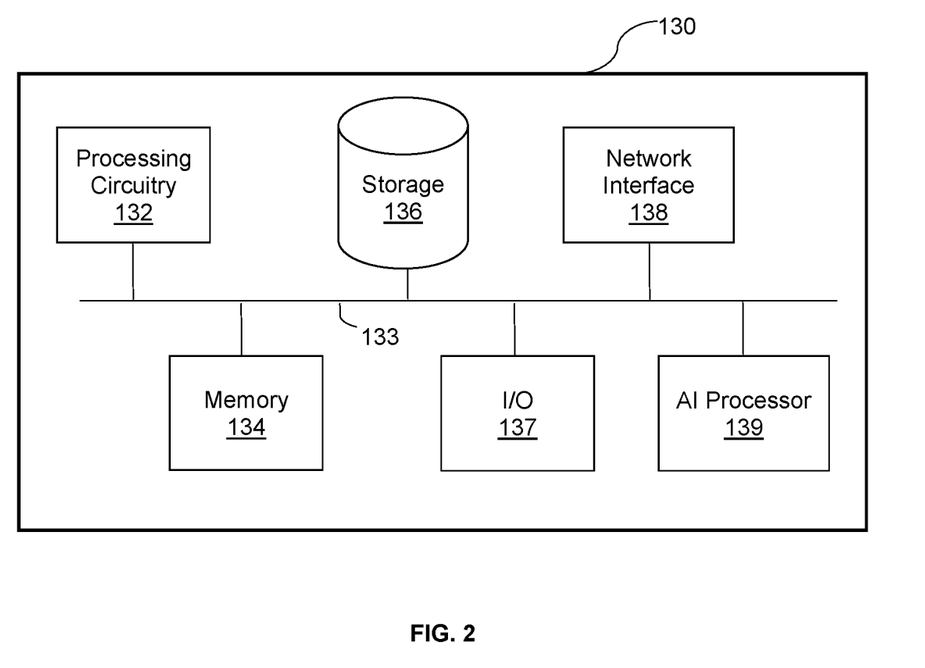
FIG. 2 is a block diagram of a controller designed according to an embodiment.

The electronic social agent 120 includes a controller 130, explained in greater detail in FIG. 2, having at least a processing circuitry 132 and a memory 134. The electronic social agent 120 may further include, or may be connected to, one or more sensors 140-1 to 140-N, where N is an integer equal to or greater than 1 (hereinafter referred to as "sensor" 140 or "sensors" 140) and one or more resources 150-1 to 150-M, where M is an integer equal to or greater than 1 (hereinafter referred to as "resource" 150 or "resources" 150). The resources 150 may include, for example and without limitation, electro-mechanical elements, sensors, detectors, display units, speakers, microphones, touch sensors, light sensors, movement detectors, cameras, and the like, as well as any combination thereof. In an embodiment, the resources 150 may encompass sensors 140 as well.

The sensors 140 may include input devices, such as various sensors, detectors, microphones, touch sensors, movement detectors, cameras, and the like. Any of the sensors 140 may be, but are not necessarily, communicatively or otherwise connected to the controller 130 (such connection is not illustrated in FIG. 1 merely for the sake of simplicity and without limitation on the disclosed embodiments). The sensors 140 may be configured to sense signals received from one or more users, the environment of the user (or users), and the like. The sensors 140 may be positioned on or connected to the electronic device 125, such as a vehicle, a robot, and the like. In an embodiment, the sensors 140 may be implemented as virtual sensors that receive inputs from online services, such as the weather forecast.

The electronic social agent 120 is configured to use the controller 130, the sensors 140, and the resources 150 in order to perform a personalized setup of features of electronic devices, for a user, as further described hereinbelow. The electronic social agent 120 uses one or more Artificial Intelligence (AI) algorithms that are adapted to determine, for one or more user actions, a corresponding probability score indicating the probability that a user will choose to perform each user action as a subsequent user action, as further discussed hereinbelow with reference to FIGS. 3 and 4. Performing a customized setup of an electronic device's features, such as a vehicles' features, provides for a reduction of the number of actions a user is required to perform, improvements to the user experience, reduction of central processing unit (CPU) processing time, and the like.

In one embodiment, the system 100 further includes a database 160. The database 160 may be stored within the electronic social agent 120 (e.g., within a storage device not shown in the figure), or may be separate from the electronic social agent 120 and connected thereto via the network 110. The database 160 may be utilized, for instance, for storing one or more user actions, various setup plans, historical data about one or more users, and the like.

FIG. 2 shows a schematic block diagram of a controller 130 included in an agent 120, such as the electronic social agent 120 of FIG. 1, according to an embodiment. The controller 130 includes a processing circuitry 132 that is configured to receive data, analyze data, generate outputs, and the like, as further described hereinbelow. The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 130 further includes a memory 134. The memory 134 may contain therein instructions that, when executed by the processing circuitry 132, cause the controller 130 to execute actions as further described hereinbelow. The memory 134 may further store therein information, such as data associated with user actions, setup plans, historical data about one or more users, and the like. As discussed above, the resources 150 include means by which the agent 120 interacts with at least one person, such as a user, collects data related to the person, and the like.

In one configuration, software for implementing one or more embodiments disclosed herein may be stored in the storage 136. In another configuration, the memory 134 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 132, cause the processing circuitry 132 to perform the various processes described herein.

The storage 136 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

In an embodiment, the controller 130 includes a network interface 138 configured to connect to a network, such as the network 110 of FIG. 1. The network interface 138 may include, but is not limited to, a wired interface, such as an Ethernet port, or a wireless interface, such as an 802.11 compliant Wi-Fi card configured to connect to a network (not shown).

The controller 130 further includes an input/output (I/O) interface 137 configured to control the resources 150 that are connected to the electronic social agent 120. In an embodiment, the I/O interface 137 is configured to receive one or more signals captured by sensors 140 of the agent 120 and send them to the processing circuitry 132 for analysis. According to one embodiment, the I/O interface 137 is configured to analyze the signals captured by the sensors 140, detectors, and the like. According to a further embodiment, the I/O interface 137 is configured to send one or more commands to one or more of the resources 150 for executing one or more plans, such as actions, of the electronic social agent 120, as further discussed hereinbelow. For example, a plan may include presenting, using a vehicle's sound system and display unit, a selected setup plan for enabling one or more user actions, as further discussed hereinbelow. According to a further embodiment, the components of the controller 130 are connected via a bus 133.

In an embodiment, the controller 130 further includes an artificial intelligence (AI) processor 139. The AI processor 139 may be realized as one or more hardware logic components and circuits, including graphics processing units (GPUs), tensor processing units (TPUs), neural processing units, vision processing unit (VPU), reconfigurable field-programmable gate arrays (FPGA), and the like. The AI processor 139 is configured to perform, for example, machine learning based on sensory inputs received from the I/O unit 137, which receives input data, such as sensory inputs, from the sensors 140. In an embodiment, the AI processor 139 is further configured to predict one or more user actions the user will try to perform and which corresponding one or more setup plans, which enable the particular user action, should be selected and presented to the user.

In an embodiment, the controller 130 is configured to collect data related to the user operating the device. At least a portion of the data is collected using one or more sensors (e.g. the sensors 140) that are communicatively connected to the electronic social agent 120. The collected data may include, for example and without limitation, images, video, audio, historical data of a user, data from one or more web sources, and the like, as well as any combination thereof. In an embodiment, the collected data may be related to the environment of the user. For example, a temperature inside a vehicle in which the user is located, a temperature outside the vehicle, time, traffic conditions, locations, weather forecasts, other people and/or pets that are located near the user, and the like, as well as any combination thereof.

In an embodiment, the controller 130 may be configured to use the collected data for extracting user characteristics. User characteristics may be, for example and without limitation, a user's age, gender, profession, and the like, as well as any combination thereof. The user characteristics may be compared by the controller 130 with characteristics of other users, which characteristics were previously analyzed. Thus, although a user may be an unfamiliar user, the controller 130 may still have the ability to predict the user's next action, such as the next vehicle's feature the user may want to use, as further discussed hereinbelow.

In an embodiment, the controller 130 applies at least one algorithm to the collected data, such as, as an example and without limitation, a machine learning algorithm for analyzing the collected data. The analysis of the collected data may be performed using, for example and without limitation, one or more computer vision techniques, audio signal processing techniques, machine learning techniques, and the like, as well as any combination thereof.

For example, the analysis of the collected data indicates that one unknown user just got in vehicle (the electronic device 125), that the user is a 50 year old male, that the vehicle is located next to an office building and that the time is 6 PM. Based on the result of the analysis, the algorithm is adapted to determine, for each possible user action, of a plurality of possible user actions, a corresponding probability score indicating the probability that the user will choose to perform a particular subsequent user action from the plurality of user actions.

A user action, or a possible user action, is an act the user may want to take, such as, as examples and without limitation, listening to music using the vehicle's multimedia system, talking on the phone using the vehicle's multimedia system, navigating home, asking the electronic social agent 120 to read new electronic mails (e-mails), adjusting the car seat, and the like. A corresponding probability score is a ranking that is associated with at least one user action of the plurality of user actions, indicating the probability that the user will choose to perform a specific user action.

For example, based on analysis of the collected data, it is determined that the first request the user (who, for example, just got into the vehicle) will make will be to navigate home. According to the same example, by applying the at least one algorithm to the collected data, and based on the analysis of the data, the controller 130 determines corresponding probability scores for each user action. According to the same example, there are many possible user actions, but the three user actions that are associated with the highest probability scores are: navigating home using the vehicle's navigation system, talking on the phone using the vehicle's multimedia system, and listening to music using the vehicle's multimedia system. According to the same example, the probability that the user will choose to navigate home is 42%, the probability that the user will choose to talk on the phone is 19%, and the probability that the user will choose to listen to music is 17%.

According to the same example, the probability score of 42% that is associated with the user action of asking the electronic social agent 120 to navigate home may be determined based on the following example collected data. The example collected data may indicate that it is Tuesday, that the time is 6 PM, that the vehicle is located next to an office building, and that, based on data that was collected from a web source (or a database), users having similar characteristics to the identified user usually navigate home at 6 PM on a weekday.

As a further example, although there are many possible user actions, it is determined that the following three user actions are associated with the highest corresponding probability scores. According to the same example, the three user actions are: navigating home using the vehicle's navigation system, talking on the phone using the vehicle's multimedia system, and listening to music using the vehicle's multimedia system. According to the same example, the probability that the user will choose to navigate home is 30%, the probability that the user will choose to talk on the phone is 15%, and the probability that the user will choose to listen to music is 19%. Thus, although it is determined that the user action of navigating home has the highest probability score (30%), the applied algorithm may determine that, based on the fact that both user actions of talking on the phone (15%) and listening to music (19%) using the phone are enabled by the same setup plan, the two user actions may be determined to have a common highest probability score (34%), based on the sum of the two probability scores (34%) with respect to the probability score of the navigate home user action (30%). Therefore, and as further discussed hereinbelow, the controller 130 may select a corresponding one or more setup plans which enable the user to listen to music and to talk on the phone.

According to an embodiment, at least one setup plan may enable a user to perform at least one user action. That is, one or more user actions may be associated with, and enabled by, one or more setup plans. A setup plan may include electronic guidance for guiding the user through setup steps that must be completed before one or more of the vehicle's features are enabled. For example, in order to play music through the vehicle's multimedia system, the user may be required to pair the user's smartphone with the vehicle's multimedia system. According to the same example, a designated setup plan that includes initiating electronic guidance for the user, and asking the user to complete the pairing between the user's smartphone and the vehicle's multimedia system, may be initiated. As another example, in order to navigate to work using the vehicle's navigation system, the user may be required to provide the user's work address. According to the same example, the setup plan that enables the navigation feature may include presenting a question to the user asking the user for his or her work address.

As further discussed hereinabove, each of the plurality of user actions may be associated with and enabled by one or more setup plans. For example, a first user action of listening to music may be enabled by a first setup plan that guides the user through the process of pairing the user's smartphone with the vehicle's multimedia system. As another example, a second user action of talking on the phone may also be enabled by the same first setup plan that asks the user to pair the user's smartphone with the vehicle's multimedia system, i.e., to provide guidance for such a pairing process. As another example, a third possible user action of navigation may be enabled by a second (i.e., different) setup plan. It should be noted that a plurality of setup plans may be stored in a database (e.g., the database 140) and may be previously associated with one or more possible predefined user actions.

In an embodiment, the controller 130 selects, based on the result of the analysis, a corresponding setup plan from the plurality of setup plans. That is, upon determination that it is most likely that the user will choose, for example, to talk on the phone (e.g., user action) using the vehicle's multimedia system, the controller 130 is configured to select a setup plan (i.e., a corresponding setup plan) that enables the user to talk on the phone using the vehicle's multimedia system. The association between the possible user actions and the different setup plans may be previously determined such that, when the controller 130 determines, based on the result of the analysis, which user action is most likely to be performed by the user, the corresponding setup plan is selected.

In an embodiment, the controller 130 is configured to present the selected setup plan to the user. The controller 130 may cause one or more electronic components (e.g., the resources 150), such as, speakers, display units, and the like, that are communicatively connected to, and controlled by, the electronic social agent 120, to present the selected setup plan to the user. The presented setup plan may include, for example, explaining to the user what is required in order to use a specific feature, using a display unit to generate a visual explanation, suggesting solutions to overcome problems during setup, and the like.

According to another embodiment, the controller 130 may determine that a particular subsequent user action (i.e., the next action the user will probably perform) requires more than one setup. Consequently, a first setup plan may be selected and executed for guiding the user through the setup process of a first feature of the vehicle and, afterwards, a second setup plan may be selected and executed for guiding the user through the second setup process of a second feature of the vehicle. For example, when it is determined that the next action the user will ask to perform is calling to the user's spouse, the first setup plan that may be selected and presented to the user is pairing the user's smartphone and the vehicle's sound system. After the pairing is done, a second setup plan, which guides the user and allows synchronizing the contacts list, may be selected and presented to the user. That is, before the pairing is done, synchronizing the contacts list cannot be achieved. Therefore, when the next action the user would like to perform is calling someone from his/her contacts list, pairing the user's smartphone should be done first.

According to a further embodiment, the user may ask to perform a user action for which a setup process has not been completed yet. Upon receiving an indication for such a desirable user action that cannot be executed due to a setup process that has not been completed yet, the controller 130 may cause an immediate execution of a corresponding setup plan that enables completion of the setup process for the desirable user action, such that the user action can be performed.

According to a further embodiment, the controller 130 may determine that a specific setup plan, which enables a user action that the user asks to perform, cannot be executed and presented to the user at the moment, such as because the user is driving. The controller 130 may be configured to generate a notification and present the notification to the user, such as using the resources 150. The notification may indicate that a desired user action cannot be executed at the moment due to a missing setup. The notification may also include a suggestion for the user to schedule the setup at the user's earliest convenience. It should be noted that the controller 130 may classify such a setup, and, consequently, a corresponding setup plan, as a high-priority setup.

It should be noted that the disclosed system and method may be used within an initial setup period, in which the electronic social agent 120 selects and presents corresponding setup plans based on analysis of the data that is collected about (at least) the user. Moreover, the disclosed system and method may be used after the initial setup period is completed, for example, when updates are received by the electronic social agent 120 that is communicatively connected to an electronic device (the electronic device 125). Further, according to an embodiment, such received updates may include software updates including, without limitation, new setup plans, and the like, as well as any combination thereof. For example, an over-the-air (OTA) software update is received by the electronic social agent 120. According to the same example, although the initial setup period had been completed months ago, a new feature of the electronic device (e.g., a social robot) is now available, such that a new setup plan may be selected and presented to the user based on analysis of the data about (at least) the user.

Figure 3:
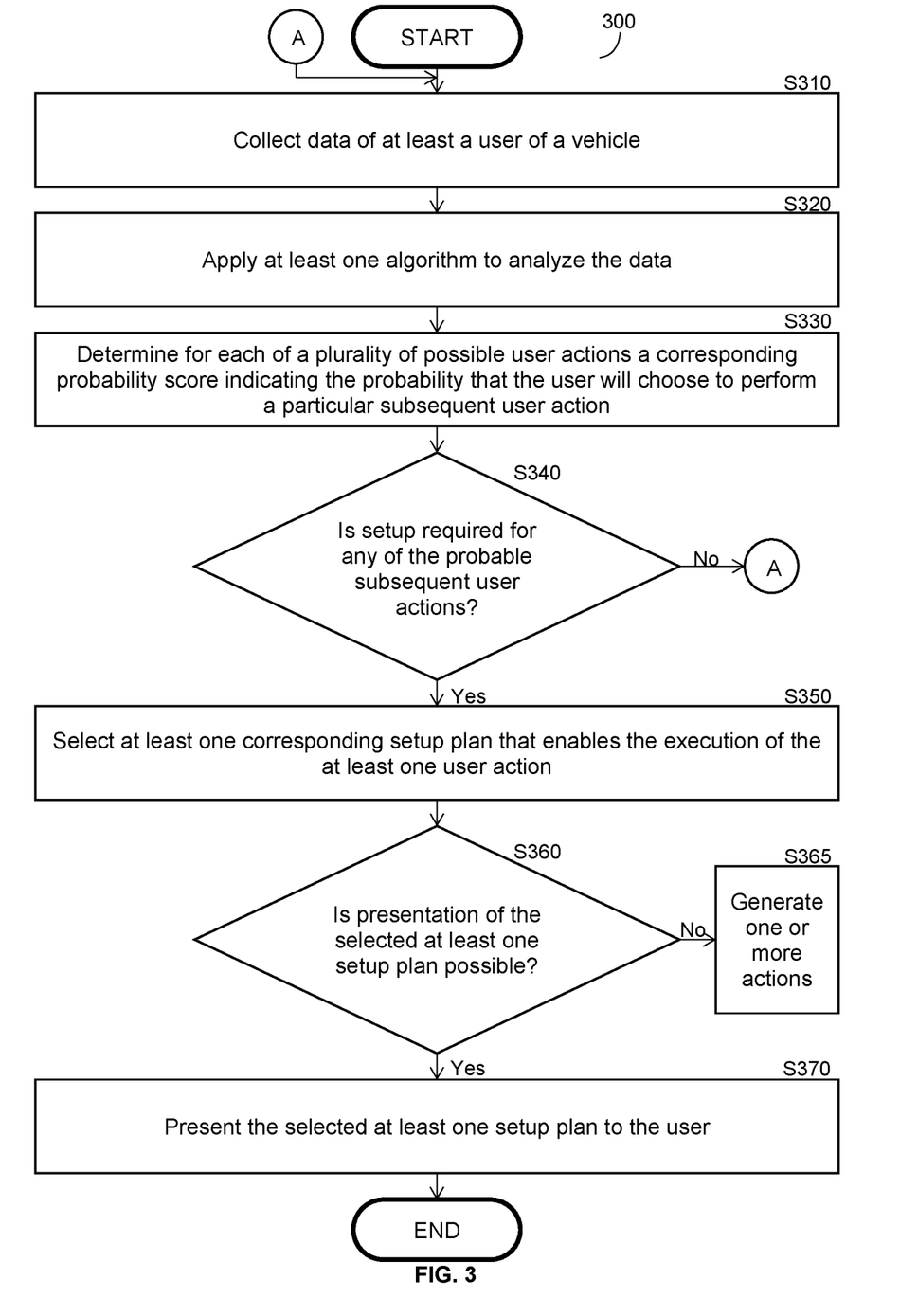
FIG. 3 is a flowchart illustrating a method for performing a personalized setup of a vehicle's features, according to an embodiment.

FIG. 3 shows an example flowchart 300 illustrating a method for performing a customized setup of a vehicle's features, according to an embodiment. The method described herein may be executed by the controller 130 that is further described hereinabove with respect of FIG. 2.

At S310, data about a user of a vehicle is collected. The user may be located within a predetermined distance from one or more sensors of the electronic social agent. The data may include information about the user, historical data, sensor data, environmental data, and the like.

At S320, an algorithm, such as a machine learning algorithm, is applied to the collected data for analyzing the data. The algorithm and/or the controller 130 (shown in FIG. 2) is adapted to determine, for each user action of a plurality of user actions, a corresponding probability score indicating the probability that the user will choose to perform a particular subsequent user action from the plurality of user actions. It should be noted that each of the plurality of user actions is enabled by a setup plan. In an embodiment, application of the algorithm, at S320, may include, without limitation, application of sensory data, web data, historical data, environment data, user data, and the like, including as described hereinabove, to generate various determinations, to provide other, like, functionalities, and any combination thereof. Further, such determinations may include, without limitation, the probability that a given user action will be the next user action, other, like, determinations, and any combination thereof. As described hereinabove, such determinations may include, without limitation, generation of one or more probability scores corresponding to each user action, and the like, as well as any combination thereof.

At S330, a corresponding probability score is determined for each possible user action. The corresponding probability score indicates the probability that the user will choose to perform a particular subsequent user action of the plurality of user actions, as further discussed hereinabove with respect of FIG. 2.

At S340, it is checked whether a setup is required for enabling any of the subsequent user actions that are probable and, if so, execution continues with S350; otherwise, execution continues with S310. For example, it may be determined that the only probable action is that the user will try to call a friend. However, the user's smartphone is already paired to the vehicle's sound system and the contact lists was synchronized as well.

At S350, one or more corresponding setup plans are selected from the plurality of setup plans. A setup plan, as may be applicable to S350 and other, like, aspects of the disclosure, is a set of one or more instructions or suggestions, where the one or more instructions or suggestions may be configured to include electronic guidance for assisting a user in completing one or more setup steps necessary to configure various vehicle features. An example of a setup plan may be, for a vehicle's multimedia system which requires a user's smartphone to be paired with the system, a plan which includes initiating electronic guidance, guidance asking the user to complete pairing of the system with the user's smartphone, and other, like, steps of such a plan. A corresponding setup plan is adapted to assist the user with a specific setup process or setup steps that are required in order to enable the user to use one or more of the vehicle's features, as further discussed herein. That is, the selected setup plan enables the user to execute at least one user action. It should be noted that a particular subsequent user action (i.e., the next action the user will probably perform) may require performance of more than one setup process. Consequently, a first setup plan may be selected and executed for guiding the user through the setup process of a first feature of the vehicle and, afterwards, a second setup plan may be selected and executed for guiding the user through the second setup process of a second feature of the vehicle, as further discussed hereinabove with respect of FIG. 2.

At S360, it is checked whether presentation of the selected one or more setup plans is possible and, if so, execution continues with S370; otherwise, execution continues with S365. Determining whether presentation of the selected setup plan is possible may be achieved by, for example, analyzing the collected data, such as by using the aforementioned algorithm. The analysis may indicate that, for example, the user will not be able to perform setup steps as required by the selected setup plan because the user is driving and, therefore, the selected setup plan may not be presented to the user at the moment.

At S365, upon determination that it is not possible to present the selected setup plan to the user, for any reason, one or more actions may be generated and performed by the electronic social agent 120. The one or more actions may include, for example, generation of a notification indicating that the setup plan cannot be executed at the moment and the reasons that the plan cannot be executed, generating a recommendation for the user to perform setup steps that are associated with the selected setup plan at the user's earliest convenience, and the like.

At S370, the selected at least one setup plans are presented to the user by the electronic social agent 120. The selected setup plans may be presented to the user using one or more resources, such as the resources 150 of FIG. 1. In an embodiment, the electronic social agent 120 is configured to set up the vehicle's features based on the setup plan. This may include performing a set of instructions that when executed causing the social agent 120 to configure vehicle features.

Figure 4:
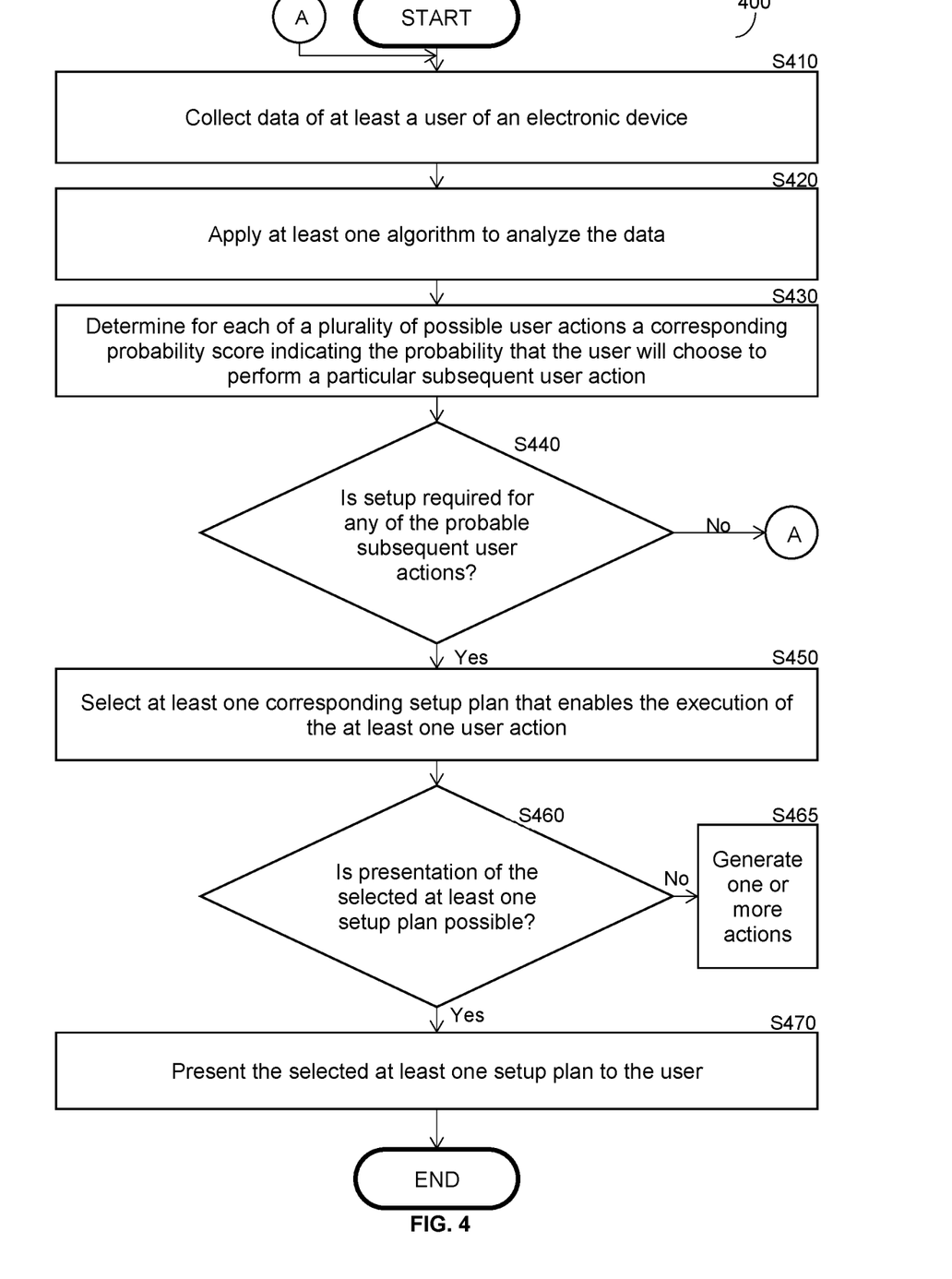
FIG. 4 is a flowchart illustrating a method for performing a personalized setup of an electronic device's features, according to an embodiment.

FIG. 4 shows an example flowchart 400 illustration a method for performing a personalized setup of an electronic device's features, according to an embodiment. The method described herein may be executed by, for example, the controller 130 that is further described hereinabove with respect to FIG. 2.

At S410, data about a user of an electronic device, such as the electronic device 125 (FIG. 1) is collected. It should be noted that the electronic device may be, for example and without limitation, a robot, a social robot, a service robot, a smart TV, a smartphone, a wearable device, a vehicle, a computer, a smart appliance, and the like. The user may be located within a predetermined distance from one or more sensors of the electronic social agent 120 and/or from the electronic device 125. The data may include information about the user, historical data, sensor data, environmental data, and the like.

At S420, an algorithm, such as a machine learning algorithm, is applied to the collected data for analyzing the data. The algorithm and/or the controller 130 (shown in FIG. 2) is adapted to determine, for each user action of a plurality of user actions, a corresponding probability score indicating the probability that the user will choose to perform a particular subsequent user action from the plurality of user actions. It should be noted that each of the plurality of user actions is enabled by a setup plan. In an embodiment, application of the algorithm, at S320, may include, without limitation, application of sensory data, web data, historical data, environment data, user data, and the like, including as described hereinabove, to generate various determinations, to provide other, like, functionalities, and any combination thereof. Further, such determinations may include, without limitation, the probability that a given user action will be the next user action, other, like, determinations, and any combination thereof. As described hereinabove, such determinations may include, without limitation, generation of one or more probability scores corresponding to each user action, and the like, as well as any combination thereof.

At S430, a corresponding probability score is determined for each possible user action. The corresponding probability score indicates the probability that the user will choose to perform a particular subsequent user action from the plurality of user actions, as further discussed hereinabove with respect to FIG. 2.

At S440, it is checked whether setup is required for enabling any of the subsequent user actions that are probable and, if so, execution continues with S450; otherwise, execution continues with S410. For example, it may be determined that the only probable action is that the user will ask a service robot, which is located within the user's house, to turn up the heat. However, no setup is required because the setup process which enables the service robot and the air conditioner to communicate has been previously completed.

At S450, one or more corresponding setup plans are selected from the plurality of setup plans. A setup plan, as may be applicable to S450 and other, like, aspects of the disclosure, is a set of one or more instructions or suggestions, where the one or more instructions or suggestions may be configured to include electronic guidance for assisting a user in completing one or more setup steps necessary to configure various electronic device features. An example of a setup plan may be, for a wireless headset which requires a user's smartphone to be paired with the headset, a plan which includes initiating electronic guidance, guidance asking the user to complete pairing of the headset with the user's smartphone, and other, like, steps of such a plan. A corresponding setup plan is adapted to assist the user with a specific setup process or setup steps that are required in order to enable the user to use one or more of the electronic device's features. That is, the selected setup plan enables the user to execute at least one user action. It should be noted that a particular subsequent user action, such as the next action the user will probably perform, may require the performance of more than one setup process. Consequently, a first setup plan may be selected and executed for guiding the user through the setup process of a first feature of the electronic device and, afterwards, a second setup plan may be selected and executed for guiding the user through the second setup process of a second feature of the electronic device.

At S460, it is checked whether presentation of the selected one or more setup plans is possible, and, if so, execution continues with S470; otherwise, execution continues with S465. Determining whether presentation of the selected setup plans is possible may be achieved by, for example, analyzing the collected data (e.g., using the abovementioned algorithm). The analysis may indicate that, for example, the user will not be able to perform setup steps as required by the selected setup plan because the user's hands are not free the moment and, therefore, that the selected setup plan may not be presented to the user at the moment.

At S465, upon determination that it is not possible to present the selected setup plan to the user, for any reason, one or more actions may be generated and performed by the electronic social agent 120. The one or more actions may include, for example, generation of a notification indicating that the setup plan cannot be executed at the moment and the reason that the plan cannot be executed, generating a recommendation for the user to perform setup steps that are associated with the selected setup plan at the user's earliest convenience, and on the like.

At S470, the selected at least one setup plan is presented to the user by the electronic social agent 120 and the selected plan is executed. The selected setup plan may be presented to the user using one or more resources, such as the resources 150 of FIG. 1. In an embodiment, the electronic social agent 120 is configured to set up the electronic device's features based on the setup plan. This may include performing a set of instructions that when executed causing the social agent 120 to configure electronic device features.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A non-transitory computer readable medium having stored thereon instructions for causing a processing circuitry to perform a process for personalization of an interaction between a social robot and a user, the process comprising:
    collecting user data related to a user using an electronic device, wherein the user data is collected, in part, using at least one sensor connected to the electronic device;
    analyzing the collected user data to determine for each user action of a plurality of user actions a corresponding probability score, wherein a probability score is a probability that the user chooses to perform a particular subsequent user action from the plurality of user actions, wherein a user action of the plurality of user actions is enabled by a setup plan;
    selecting based on the probability scores at least one setup plan corresponding to an action having the highest probability score; and
    configuring a feature of the electronic device based on the selected setup plan.

2. The non-transitory computer readable medium of claim 1 having stored thereon instructions for causing a processing circuitry to further perform:
    presenting the at least one selected corresponding setup plan using one or more resources that are connected to and controlled by an electronic social agent.

3. The non-transitory computer readable medium of claim 1, wherein the electronic device is a vehicle.

4. The non-transitory computer readable medium of claim 1, wherein the collected data further comprises data regarding a user's environment.

5. The non-transitory computer readable medium of claim 1, wherein the collected data further comprises historical data about the user.

6. The non-transitory computer readable medium of claim 1 having stored thereon instructions for causing a processing circuitry to further perform:
    receiving a new software update for an electronic social agent.

7. The non-transitory computer readable medium of claim 6, wherein the new software update includes at least one new setup plan.

8. The non-transitory computer readable medium of claim 1 having stored thereon instructions for causing a processing circuitry to further perform:
    applying at least one machine learning on the collected user data.

* * * * *